United States Patent Office 3,173,948
Patented Mar. 16, 1965

3,173,948
CRYSTALLINE POTASSIUM SORBATE AND PREPARATION THEREOF FROM A BASIC AQUEOUS SOLUTION
Otto Probst and Horst Oehme, Frankfurt am Main, Germany, assignors to Farbwerke Hoechst Aktiengesellschaft vormals Meister Lucius & Brüning, Frankfurt am Main, Germany, a corporation of Germany
No Drawing. Filed Jan. 29, 1963, Ser. No. 254,581
Claims priority, application Germany, Feb. 3, 1962, F 35,928
3 Claims. (Cl. 260—526)

The present invention relates to stable, storable potassium sorbate and to a process for its manufacture.

It is known that the alkali metal salts of sorbic acid are readily soluble in water. As a preserving agent for foodstuffs, sorbic acid is preferably used in the form of its readily soluble salts. Since sodium sorbate has a poor storability, it is more suitable to use the more stable potassium sorbate.

In the manufacture of potassium sorbate, the obtaining of a storable product must particularly be kept in mind. The crystallization of potassium sorbate from its aqueous solution by evaporation of the water yields a product of insufficient stability and which undergoes discoloration as time goes on. The precipitation of potassium sorbate from aqueous solutions with the aid of organic solvents, suitably with the simultaneous removal of water as an azeotrope, is expensive and complicated.

It has now been found that stable, storable crystalline potassium sorbate can be produced by atomizing an alkaline potassium sorbate solution having a higher pH value than corresponds to the equivalence point into a heated atmosphere to reduce the water content of the potassium sorbate by evaporation to less than 0.2% by weight.

By alkaline potassium sorbate solution there is to be understood a solution the pH value of which is higher than the equivalence point of potassium sorbate. The equivalence point is the pH value of a solution of equivalent parts of potassium and sorbate ions.

The success of the drying process, i.e. the production of a stable, storable potassium sorbate, substantially depends on the maintenance of a definite pH value of the potassium sorbate solution. A product having a good stability in storage can only be obtained when the pH value of the solution used is above the equivalence point which is at about pH 9.2 for a 20% potassium sorbate solution. A higher pH value has no detrimental effect, but with an increasing pH value the purity of the potassium sorbate decreases because the content of free potassium hydroxide in the dry product increases. It is especially suitable to use as starting solution a solution which, when the content of potassium sorbate has been adjusted to 20% by dilution or concentration, has a pH value in the range of 9.5 to 9.8. A solution of the same composition which has a concentration of 50% of potassium sorbate has a pH value of 10.0 to 10.5. In practice it is suitable to add to an about 50% potassium sorbate solution such an amount of potassium hydroxide that it becomes just weakly pink with phenolphthalein as indicator. If the proposed pH value of the potassium sorbate solution is not maintained in the definite range, the spray drying process yields a salt which changes its color and acquires an unpleasant odor after having been stored for a few weeks.

The upper limit of the concentration of the potassium sorbate solution to be processed by spray drying is determined by the solubility of the salt in water. It is about 56% at room temperature. The lower limit of the concentration of the solution is only set by economical reasons. It is more advantageous, of course, to subject to the drying process not too dilute a solution because with a decreasing concentration of the starting solution the expenditure of energy increases. From the technical point of view no difficulties are encountered in processing according to the invention very dilute potassium sorbate solutions into the crystalline salt. It is more economical, however, to process highly concentrated solutions, preferably those having a concentration of more than 40% and more advantageously more than 50%.

The moisture content of the potassium sorbate obtained according to the invention by atomizing its aqueous solutions shall be less than 0.2%. An expert can readily control the mode of operation of a spray drying device in a manner such that a product is obtained, the residual moisture content of which is below the defined limit. To achieve this, the proportion of the hot gas blown into the atomized liquid must be raised until the salt leaving the process has the desired moisture content or the gas must be heated to a higher temperature. In the present process the first step is preferred since the temperature of the gas cannot arbitrarily be increased in view of the sensitiveness of potassium sorbate. Gas temperatures of up to 150° C. have no detrimental effect. It may be possible to evaporate the solution even at room temperature, for example when a very fine nozzle is used for atomizing the potassium sorbate solution or the atomization is carried out under reduced pressure. In general, the drying process is conducted at atmospheric pressure or under reduced pressure. In principle, higher pressures may likewise be used, this being, however, without particular advantage.

The moisture content of a potassium sorbate which has been produced by spray drying has a much greater influence on its stability in storage than the moisture content of a potassium sorbate obtained by crysallization from a solvent or by azeotropic removal of the water from aqueous solutions. The products obtained by the known processes have a certain stability in storage even with higher water contents. The requirement of a lower residual water content in the present process does not involve any disadvantage since it can be reached without special expenditure by any appropriate control of the drying process.

As spray drying device there may be used any known apparatus of this category. For obtaining a coarse-grained potassium sorbate it is suitable to atomize the solution with a pressure nozzle. The expression "atomizing" as used herein defines a fine distribution of a liquid phase into a gaseous phase to form droplets of a size in the range from about 10µ to about 1.5 mm.

Aqueous solutions of potassium sorbate are principally atomized, since this is especially advantageous for reasons of economy. The process of the invention can be used, however, for solutions of potassium sorbate in any solvent.

The solution to be atomized can be prepared, for example, by dissolving sorbic acid in aqueous potassium hydroxide solution. When the sorbic acid used has a high degree of purity and pure potassium hydroxide is employed, an aqueous potassium sorbate solution of high purity is obtained, which can be directly processed into a marketable product of high quality.

It is known that sorbic acid as well as some salts and esters thereof tend to autoxidation. Therefore, it could have been expected that the atomization should be effected in an oxygen-free gas current. The use, however, of an inert gas, for example nitrogen or a noble gas, for drying the sorbate solution would require a gas cycle in an industrial unit for economical reasons. The dehumidification of the gas cycle to a low and tolerable degree is very complicated and requires high energy costs. It is surprising that under the conditions of the present invention an air current can be used for drying and that a product is obtained which, during the drying process and during storage, does not undergo a change as to its odor and color.

In the spray drying process under the conditions of the invention a solid potassium sorbate is obtained consisting of agglomerates of a large number of small crystals. The surface of the salt exposed to the air is very large, but when the product has the required low moisture content and when it has been obtained from a solution having the defined pH value, an autoxidation of the crystalline potassium sorbate only commences extremely slowly.

The process of the invention is not only distinguished by the simple manner in which it is carried out as compared with the known processes for the manufacture of stable, storable potassium sorbate, but also the product obtained has properties which are superior to those of the products obtained by the known processes (flowability, solubility and stability in storage).

The following examples serve to illustrate the invention but they are not intended to limit it thereto, the parts being by weight unless otherwise stated.

*Example 1*

An enamelled vessel was charged, while stirring and cooling, with 200 parts of aqueous potassium hydroxide solution of 30% strength and 119.5 parts of crystalline sorbic acid. A sample of the potassium sorbate solution of about 50% strength was colored weakly pink with phenolphthalein as indicator. After having diluted a sample with water to 20%, a pH value of 9.7 was measured in a pH-meter at 20° C. A small amount of active carbon was added, while stirring, to the about 50% solution, the solution was filtered through a filter press and the clear solution was atomized under a pressure of 7 atmospheres gauge in a drying tower of 12 m. height and 2 m. diameter. 86 kilograms of the atomized aqueous solution and 1700 m.$^3$ (NTP) of air were fed to the tower per hour in co-current with one another. The air was indirectly heated with high pressure steam to a temperature of 155° C. at the tower inlet. At the tower outlet the air current had a temperature of 95° C. and before the ventilator a temperature of 76° C. Between the outlet of the tower and the ventilator the drying air passed a separator and a cyclone from which the dried potassium sorbate fell in a delivery bin. The lower conic part of the bin was provided at the inside with a metal frit through which was introduced a current of air of 30 m.$^3$ (NTP) per hour into the tower operated under a vacuum of 400 mm. of water column.

In this manner a flowable potassium sorbate was obtained which had a water content of less than 0.1%. The light absorption of a 15% aqueous solution of the potassium sorbate was 5.5%, measured in a Lange colorimeter with blue filter at a wave length of about 415 m$\mu$ and with a layer thickness of 15 mm., pure water being the comparative sample. After a storage time of 3 months a substantial increase of the absorption could not be detected. After 6 months the product had not undergone changes in color and odor. The flowability of the potassium sorbate remained unchanged during this period of time.

*Example 2*

(Comparative example)

An about 50% potassium sorbate solution was prepared as described in Example 1, with the exception that a slight excess of sorbic acid was used so that a sample did not turn pink with phenolphthalein as indicator. After having been diluted with water to 20%, the solution had a pH value of 9.2 at 20° C. The solution was atomized and dried under the conditions specified in Example 1. Directly after its manufacture the potassium sorbate obtained did not differ from the product of Example 1. After a storing time of 4 weeks a change in odor and color was already observed. The absorption of a 15% solution increased from initially 2.0 to 11%. When the potassium sorbate was stored for a longer time, the changes became more intense.

*Example 3*

(Comparative example)

An about 50% potassium sorbate solution was prepared as described in Example 1. 93 kilograms of the about 50% solution were atomized per hour under the same pressure of 7 atmospheres gauge but with the use of a larger nozzle. The current of air of 1700 m.$^3$ (NTP) per hour was heated to 150° C. at the tower inlet. The temperatures at the tower outlet and before the ventilator were 88° C. and 70° C., respectively. The dry salt was not additionally ventilated through a frit in the delivery bin as described in Example 1. The potassium sorbate had a water content of 0.24%. At first the product did not differ from the product of Example 1. After 4 weeks a 15% aqueous solution had about double the absorption value (cf. Example 2). Simultaneously, the product formed lumps. After 3 months the potassium sorbate had an unpleasant odor, formed a coherent mass and had turned yellow. A 15% aqueous solution had 4 to 5 times the original absorption value (measured after the manufacture).

We claim:

1. A process for the manufacture of stable, storable, crystalline potassium sorbate containing less than 0.2 percent by weight of water which comprises atomizing an aqueous potassium sorbate solution, said solution having a pH of at least 9.2 when measured at 20° C. at a concentration of 20 percent by weight, into an atmosphere having a temperature between room temperature and 155° C., whereby water is evaporated from said solution.

2. A process as in claim 1 wherein said solution has a pH between 9.5 and 9.8 when measured at 20° C. at a concentration of 20 percent by weight.

3. A stable, storable, crystalline potassium sorbate containing less than 0.2 percent by weight of water and obtained by atomizing an aqueous potassium sorbate solution, said solution having a pH of at least 9.2 when measured at 20° C. at a concentration of 20 percent by weight, into an atmosphere having a temperature between room temperature and 155° C.

References Cited in the file of this patent

UNITED STATES PATENTS 2,866,819     Montagna et al. _____ Dec. 30, 1958

FOREIGN PATENTS 1,045,390     Germany _____ Dec. 4, 1958